(12) United States Patent
Wood (10) Patent No.: US 11,021,260 B2
(45) Date of Patent: Jun. 1, 2021

(54) AIRCRAFT FUEL SYSTEM (71) Applicant: Eaton Intelligent Power Limited, Dublin (IE)

(72) Inventor: John Wood, Titchfield (GB)

(73) Assignee: Eaton Intelligent Power Limited, Dublin (IE)

( * ) Notice: Subject to any disclaimer, the term of this patent is extended or adjusted under 35 U.S.C. 154(b) by 373 days.

(21) Appl. No.: 15/775,226

(22) PCT Filed: Oct. 28, 2016

(86) PCT No.: PCT/EP2016/076145
§ 371 (c)(1),
(2) Date: May 10, 2018

(87) PCT Pub. No.: WO2017/080854
PCT Pub. Date: May 18, 2017

(65) Prior Publication Data
US 2018/0370649 A1    Dec. 27, 2018

(30) Foreign Application Priority Data
Nov. 12, 2015 (GB) .................................... 1519947

(51) Int. Cl.
*B64D 37/32* (2006.01)
*B64D 37/10* (2006.01)
*B64D 37/24* (2006.01)

(52) U.S. Cl.
CPC ............. *B64D 37/32* (2013.01); *B64D 37/10* (2013.01); *B64D 37/24* (2013.01)

(58) Field of Classification Search
CPC .......... B64D 37/32; B64D 37/24; B64D 37/10
See application file for complete search history.

(56) References Cited

U.S. PATENT DOCUMENTS

| 2,870,936 A | 1/1959 | Clayton |
| 6,830,219 B1 * | 12/2004 | Picot .................. B01D 19/0005 244/121 |
| 2012/0193479 A1 | 8/2012 | Roscoe et al. |

(Continued)

FOREIGN PATENT DOCUMENTS

| EP | 1591359 A1 | 11/2005 |
| EP | 2551200 A2 | 1/2013 |

OTHER PUBLICATIONS

International Search Report, PCT/EP2015/076145, dated Jan. 25, 2017.

*Primary Examiner* — Jessica B Wong
(74) *Attorney, Agent, or Firm* — Fishman Stewart PLLC (57) ABSTRACT

An aircraft fuel system including at least one fuel tank, a source of inerting gas, an inlet for introducing the inerting gas into the at least one fuel tank, and a vent system arranged to allow the inward and outward venting of air from the fuel tank. In embodiments, the vent system includes a vent, an inward vent pressure valve disposed between the vent and the at least one fuel tank and configured to enable the at least one fuel tank to increase by a predetermined pressure over ambient air pressure, and an outward vent pressure valve disposed between the at least one fuel tank and the vent and configured to enable the at least one fuel tank to decrease by a predetermined pressure below ambient air pressure.

14 Claims, 6 Drawing Sheets

(56) References Cited

U.S. PATENT DOCUMENTS

2015/0096984 A1\* 4/2015 Ashton ................... B64C 3/34
　　　　　　　　　　　　　　　　　　　　　220/88.3
2016/0009406 A1\* 1/2016 Burnell ................. B64D 37/10
　　　　　　　　　　　　　　　　　　　　　244/135 R \* cited by examiner

PRIOR ART

AIRCRAFT FUEL SYSTEM

CROSS-REFERENCE TO RELATED APPLICATION

This application is a National Stage Patent Applications of International Patent Application No. PCT/EP2016/076145, filed Oct. 28, 2016, which claims the benefit of British Application Serial No. 1519947.4, filed Nov. 12, 2015, the contents of each are incorporated by reference in their entireties.

TECHNICAL FIELD

This invention relates to aircraft fuel systems and to aircraft including an aircraft fuel system.

BACKGROUND

In fixed wing aircraft, the fuel is usually stored in tanks in the main wing. A typical configuration includes a centre tank and one or two multi-compartmented main tanks in each wing. The tanks are generally vented, to avoid unwanted pressurisation, and, in many configurations, it is common to have a vent (or surge) tank located outboard of each main wing tank. Both inward venting, for example to allow for the burn rate of the fuel exiting the tank and during descent, and outward venting, for example during refueling and during ascent, are accommodated by the vent system. The tank is therefore maintained at substantially ambient pressure. The venting of the tanks may be through the vent tank which typically includes a NACA intake. The skilled person will appreciate that the use of a NACA duct does maintain a slight over pressurisation of the tank during flight but that this is only at a modest pressure (such that the tank would still normally be considered to be at near ambient air pressure).

Aircraft fuel tanks are now subject to fuel tank flammability requirements (for example, FAR25.981b). For example, it may typically be required that flammability hazard posed by the fuel tank is reduced by maintaining the oxygen concentration below a pre-set limit. For example, in a civil aircraft the residual oxygen concentration within the fuel tank may be required to be below 12%. In military aircraft the certification requirements will typically be more restrictive (due to the greater threat of an ignition source) and therefore, the residual oxygen concentration within the fuel tank may be required to be below 9%.

SUMMARY

In order to meet these requirements aircraft are now commonly provided with an "inerting system" which is effective in reducing the flammable gas within the ullage space which exists above the fuel within each fuel tank. An inerting system provides a supply of inert gas to the ullage to reduce the oxygen content therein. A preferred type of system is the "continuous flow" as opposed to the stored gas system. In the continuous flow system type, the NEA is generated on demand. For example, inerting systems may comprise a system in which Nitrogen Enriched Air (NEA) is generated by an On Board Inert Gas Generating System (OBIGGS) which is then pumped into the fuel tanks. This reduces the flammable oxygen content of the fuel tank.

The Continuous Flow type of system tends to be lighter and less complex than the stored gas class of system. The size of a continuous flow system may be minimised by filling the fuel tanks with NEA having a low concentration of oxygen prior to the period of descent or rapid descent and supplying sufficient NEA to the tanks to ensure that the bulk average of the oxygen concentration at the end of descent is less than the pre-set limit. A problem with this sizing condition is that in the case where the flow of NEA is insufficient to prevent the inflow of air, the air enters the tank at one or more vent valves (typically two per tank). Consequently, in the zones local to the vent port or valve the oxygen concentration is greater than the pre-set limit creating an ignition "pocket". Such a pocket tends to be concentrated by the wing ribs or any internal structure or baffles. Such problems may be particularly significant in military aircraft due to the combination of higher risk factors and the increased likelihood of rapid decent (for example due to a tactical manoeuvre). For example, in a military aircraft, the sizing condition could be driven by the need to perform a rapid tactical descent of a military transport prior to landing at a forward airstrip with a limited secure zone. In such a scenario, having a short exposure to the risk of an oxygen "pocket" within the fuel tank may be unacceptable.

One solution to this problem has been proposed in the Applicant's earlier International Patent Application WO2013/164311A1, in which a vent duct is provided within the fuel tank to distribute inwardly vented air.

It will however, be appreciated that the provision of any inerting system carries a direct weight and/or space penalty for the aircraft (which may result in decreased range and/or fuel efficiency) and that this is driven by the sizing requirement. As such, there is an ongoing need to provide alternate or improved inerting systems which address or mitigate at least some of the disadvantages of existing systems.

According to one aspect of the invention there is provided an aircraft fuel system comprising at least one fuel tank; a source of inerting gas; an inlet for introducing the inerting gas into the at least one fuel tank; and a vent system arranged to allow the inward and outward venting of air from the fuel tank, wherein the vent system comprises: a vent, an inward vent pressure valve disposed between the vent and the at least one fuel tank and configured to enable the at least one fuel tank to increase by a predetermined pressure over ambient air pressure; and an outward vent pressure valve disposed between the at least one fuel tank and the vent and configured to enable the at least one fuel tank to decrease by a predetermined pressure below ambient air pressure.

The at least one fuel tank may comprise a number of interconnected bays (for example formed between adjacent wing ribs).

The source of inerting gas may be an on board inert gas generating system. The inerting gas may be Nitrogen Enriched Air ("NEA").

The inward vent pressure valve enables a predetermined degree of negative pressure to be reached/maintained within the tank. Allowing a negative pressure to develop within the tank enables the point during decent at which the tank starts to inwardly vent air to be delayed.

The outward vent pressure valve enables a predetermined degree of positive pressure to be reached/maintained within the tank. Allowing a positive pressure to develop within the tank allows an increased mass of reduced oxygen concentration gas to be stored in the tank. This means that the tank may store additional NEA prior to descent.

It will be appreciated that the predetermined positive and negative pressure may be selected tanking into account the parameters of the particular aircraft to which the system is being applied. The type and/or intended role of the aircraft may for example be one factor. The type of OBIGGS may also be a consideration. The predetermined pressure limits may, for example, be based upon the structural integrity of the wing. The selected pressure limits may be a compromise between structural weight and capacity and weight of the OBIGGS.

The predetermined positive pressure may, for example, be up to 6 psig. The predetermined negative pressure may, for example, be down to −3 psig.

The vent pressure valves may be check valves. The cracking pressure of the valves may be selected to ensure that the pressure differential across the tank within the structural design limits of the at least one fuel tank (whilst also allowing that either above or below ambient pressure may be reached in the tank).

The vent system may further comprise a vent tank. The inward vent valve may be disposed between the at least one fuel tank and the vent tank. The outward vent valve may be disposed between the at least one fuel tank and the vent tank.

The vent may comprise a vent duct extending from the vent tank to the exterior of the aircraft. The vent duct may be a NACA duct.

Whilst the term "vent tank" is used herein for consistency it will be appreciated that this is not intended to limit to any particular configuration. In some aircraft the vent tank may also function as a surge tank to allow overflow of excess fuel and may therefore be alternatively referred to as a "surge tank". Likewise, in some configurations the vent tank may be a vent box.

It may be appreciated that the inlet to the vent tank (for example the NACA duct) may conventionally be configured to provide a slight increase in pressure in the fuel system relative to ambient pressure (due to a RAM air effect). For example, during flight a conventional vent system may be arranged to be at around 1.5 pressure ratios relative to ambient. It will be appreciated that the actual pressure ration in the vent system may depend upon the type of aircraft, for example supersonic military aircraft may be configured to develop pressure ratios several times ambient level depending on Mach number. As such, by providing the inward and/or outward pressure valves between the fuel tank and the vent tank the pressure in the fuel tank may be allowed to increase and/or decrease by a predetermined pressure above and/or below the pressure in the vent tank (which in turn is directly related to the ambient air pressure).

The fuel system may further comprise an outlet extending from the at least one fuel tank to the outward vent valve. The outlet may comprise a float valve in the at least one fuel tank.

The fuel system may comprise a vent distribution duct extending through the at least one fuel tank. The vent distribution duct may be arranged to receive inwardly vented air from the vent system and distribute the inwardly vented air across the at least one fuel tank. The vent distribution duct may distribute inwardly vented air across a plurality of interconnected bays within the fuel tank. The vent distribution duct may convey inwardly vented air to substantially each interconnected bay within the at least one fuel tank. The vent distribution duct may be an open channel. Alternatively, the vent distribution duct may have a substantially closed cross section with a plurality of exit apertures arranged to deliver inwardly vented air to a plurality of different locations in the fuel tank. The vent distribution duct may be a specially formed duct or may be formed by existing aircraft structure (such as for example one or more stringers or other reinforcing member of the fuel tank or aircraft wing).

A further advantage of the valved vent arrangement of the invention is that when inwardly venting air the negative pressure which may develop within the tank may assist with the distribution of inwardly vented air. Embodiments may provide a pressure differential between the fuel tank and vent system to help distribute the inwardly vented air through the vent distribution line.

To allow the full available pressure differential to be used to drive the distribution of the inwardly vented air it may be advantageous to separate the vent distribution and the inward pressure valve (such that the vent distribution configuration is not a limitation in the event of a rapid decent). The fuel system may comprise an inward vent line for directing inwardly vented air from the vent to the at least one fuel tank. The inward vent line may direct air to the vent distribution duct. The inward vent line may extend from the vent tank to the vent distribution duct. The inward vent pressure valve may bypass the inward vent line. Accordingly, the inward vent line and inward vent pressure valve may be arranged as parallel communication paths between the tank and the vent. The inward pressure valve may therefore provide a pressure relief route in the event that the inward venting requirement exceeds the level provided by the inward vent line and/or vent distribution duct. For example, the pressure relief route may be required if the aircraft descent rate exceeds the inerting system design limit. In normal operation the pressure relief valve may remain closed such that inward venting is minimised.

The inward vent pressure valve may be provided in the outlet extending from the at least one fuel tank to the outward vent pressure valve. Thus, in some embodiments both the inward and outward vent pressure valves may be provided in an outlet vent and a separate parallel vent distribution may be provided for normal inward venting.

The inlet for introducing the inerting gas may deposit the inerting gas into the inward vent line. This provides the advantage of premixing the inerting gas and inwardly vented air to minimise the risk of oxygen pockets. Other inlets for inerting gas may optionally be provided in the at least one fuel tank.

The inward vent line may include a mixing chamber. The inlet for introducing inerting gas may deposits the inerting gas at the mixing chamber. This may further enhance the mixing prior to introduction into the tank (for example through the vent distribution duct).

The inward vent pressure valve may be exposed to (for example directly in communication with) pressure from the at least one fuel tank. For example, the vent system may further comprise a bleed duct in fluid communication with the at least one fuel tank to expose the valve to the tank pressure. The pressure from the at least one fuel tank may be provided to the valve seat of the inward pressure valve. Advantageously, this arrangement ensures that the valve is actuated by the full pressure differential between the at least one tank and the ambient atmosphere (or the vent tank pressure which is directly related to the ambient pressure). This in turn allows the full pressure differential of the tank to be utilised in the inward vent air distribution during normal operation.

According to a further aspect of the invention, there is provided an aircraft comprising an aircraft fuel system in accordance with embodiments of the invention.

Embodiments of the invention may allow for an inexpensive method of augmenting the inerting capabilities of an aircraft fuel system. It may be conveniently retrofitted and may reduce the load placed on a NEA system allowing for a reduced capacity NEA system to be deployed, reducing costs and weight.

BRIEF DESCRIPTION OF THE DRAWINGS

The invention may be performed in various ways, and embodiments thereof will now be described by way of example only, with reference being made to the accompanying drawings, in which.

DETAILED DESCRIPTION

Figure 1:
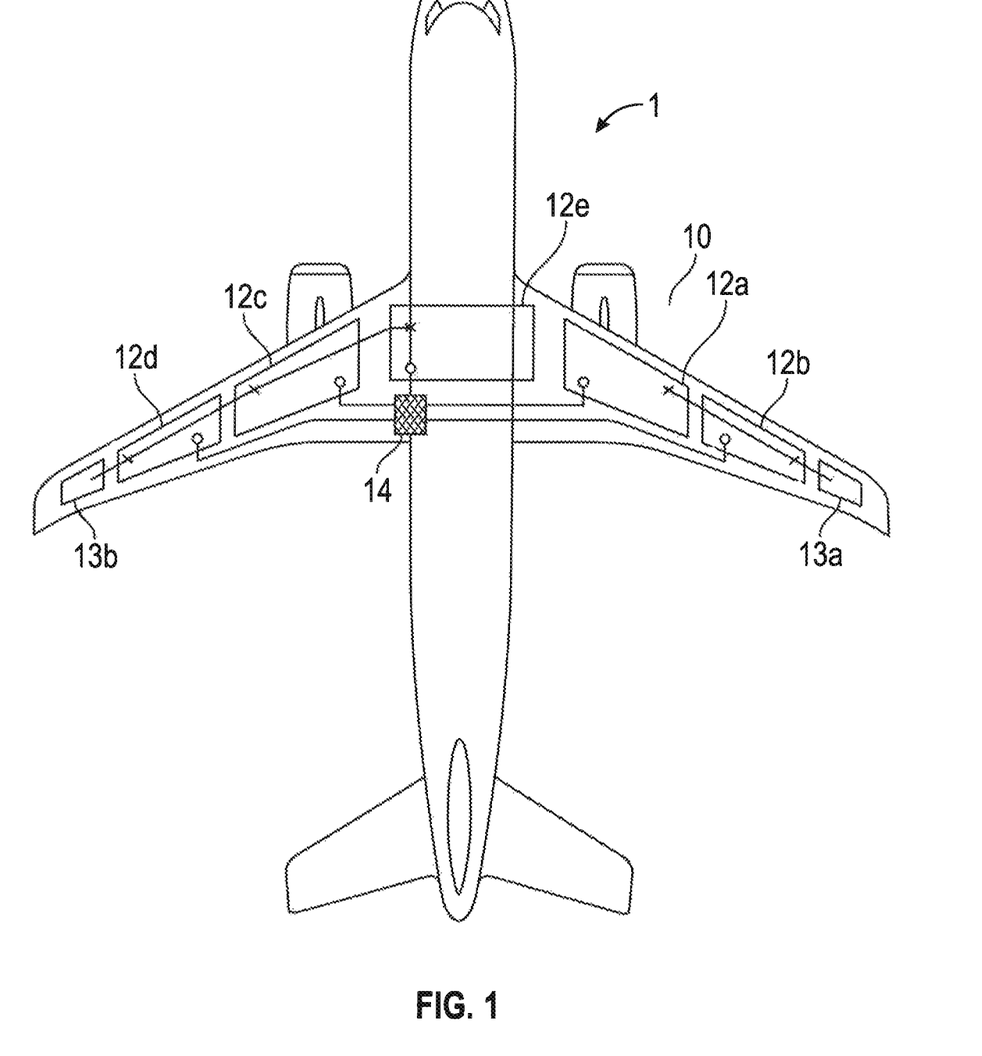
FIG. 1 is a schematic view of an aircraft including an aircraft fuel system which may incorporate embodiments of the invention.

FIG. 1 shows a typical fixed wing aircraft, which may for example be a civil airliner. The aircraft includes a multi-tank fuel system 10. As is typical of such aircraft, the fuel system 10 includes a plurality of fuel tanks 12a to 12e, including for example a centre fuel tank 12e and a pair of fuel tanks in each wing. In some aircraft, only a single tank may be provided in each wing. The wings are further provided with a surge tank 13 which is associated with a vent arrangement to enable venting of the fuel tanks 12 during operation. An inerting system 14 is provided for ensuring a reduced flammability environment and is in communication with each fuel tank 12 via appropriate conduits. The inerting system may include a source of NEA, which may be any suitable form of air-separation device, typically implementing Hollow Fibre Membrane technology. The aircraft fuel tank 12 is connected to a source of NEA via a control valve (not shown). The term "nitrogen-enriched air" or NEA is used in this specification to mean air which has passed through an air-separation device including separation means intended to increase the nitrogen content in the air with a commensurate reduction in the oxygen content.

Figure 2:
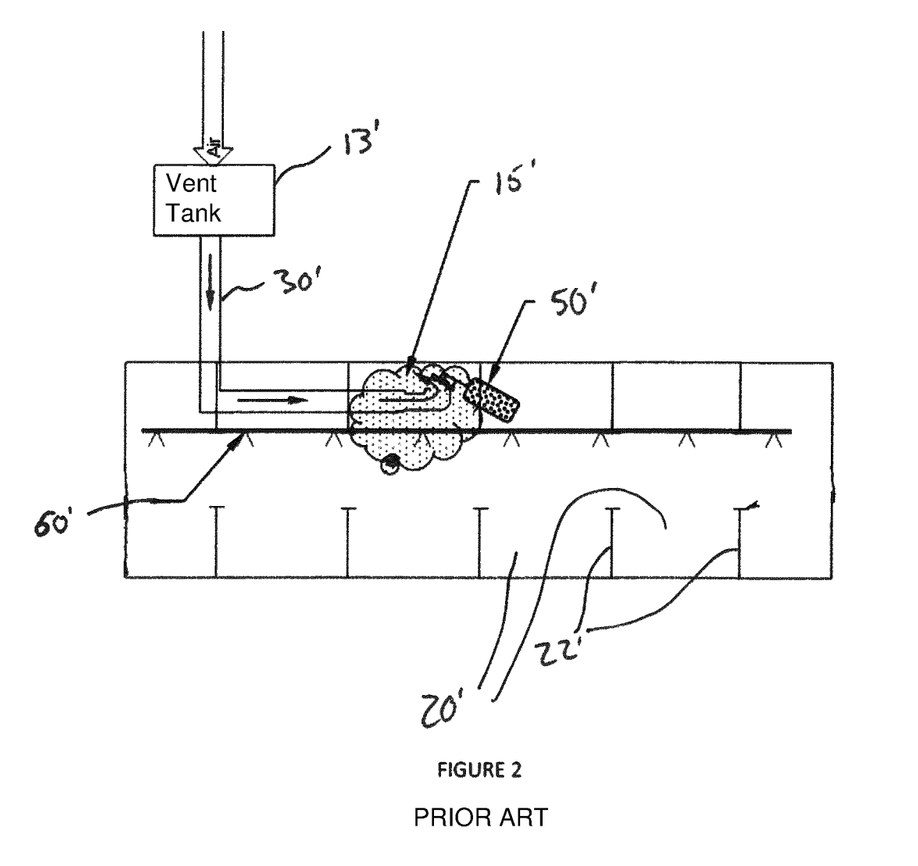
FIG. 2 is a schematic view of a prior art aircraft fuel tank inerting and vent system.

FIG. 2 shows a typical prior art arrangement. A fuel tank 12' (which may for example be one of the wing fuel tanks in FIG. 1) is divided into inter-connecting bays (or volumes) 20', separated by wing ribs and/or tank baffles 22'. An inerting system is provided which introduces NEA via an inlet 60' which in the illustrated example is a line with multiple outlets distributed around the tank 12'. The tank 12' is vented via the vent tank 13' and a vent line 30'. The outlet of the vent line is provided with a float valve 50' to prevent fuel from the tank 12' from entering the vent line 30' (two vent lines/outlets may be provided in a single tank for redundancy but only one is illustrated for clarity). As mentioned above, a disadvantage of this known arrangement is that the inwardly vented air may initially accumulate around the location of the vent valve 32' (and the mixing of the incoming air may be impeded by the ribs or baffles 22'). Even if NEA is mixed with the inflowing air, the local zone adjacent the vent valve will still be found to have an increased oxygen content, particularly during rapid descents. This pocket 15' creates an oxygen hotspot. In a civil aircraft, this may be acceptable if the overall oxygen content remains sufficiently low and the pocket is only temporary; however, in a military or other aircraft operating in a high risk environment this may not be acceptable (and may require an increase in the sizing of the inerting system).

Figure 3:
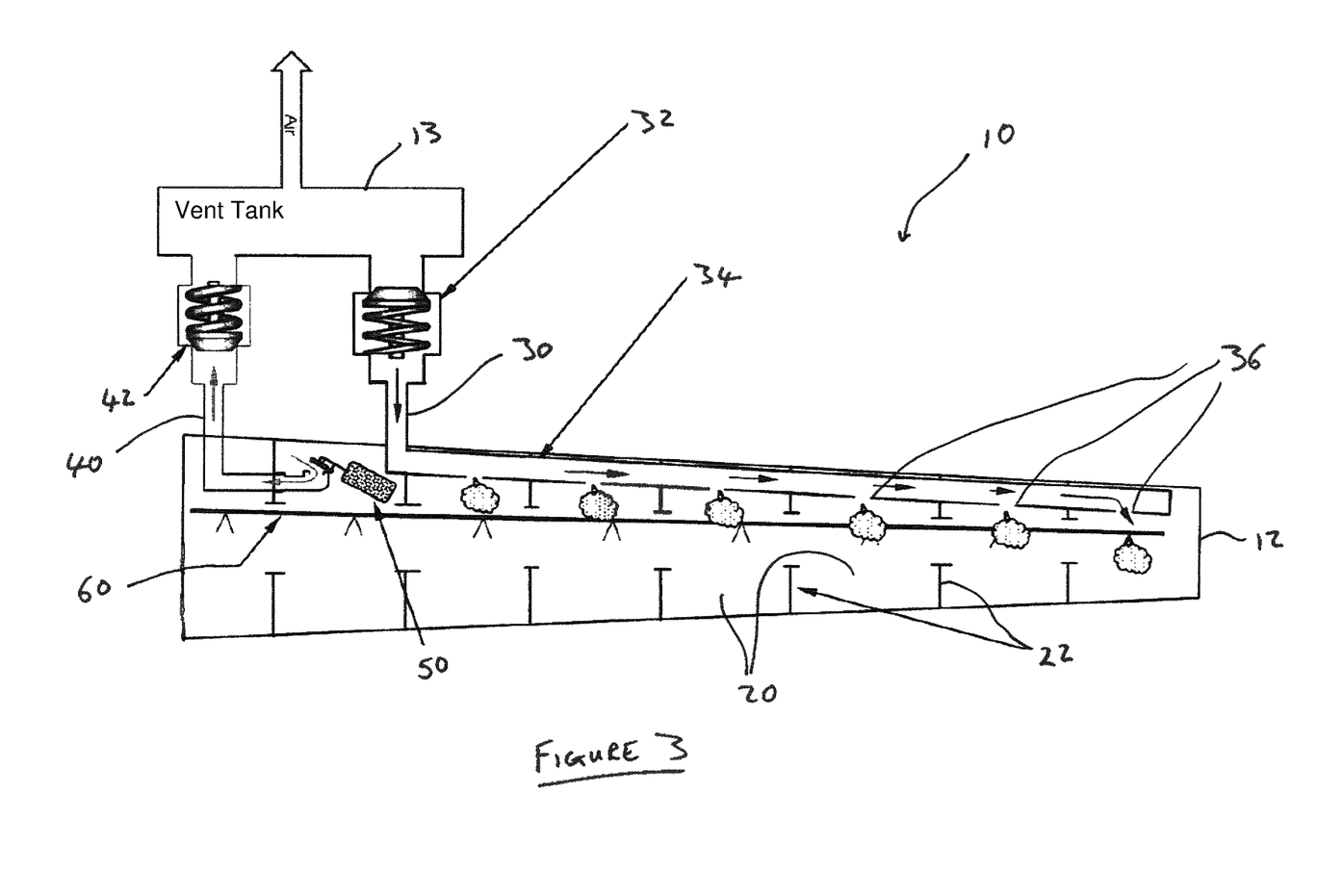
FIG. 3 is a schematic view of an aircraft fuel tank inerting and vent system in accordance with a first embodiment of the invention.

In accordance with an embodiment of the invention, a modified fuel system is provided in which an inward vent valve 32 and outward vent valve 42 are provided to allow a degree of over or under pressure to be developed within the fuel tank 12. Thus, the modified fuel system provides a partially closed vent system.

The modified fuel system of the embodiment comprises an inward vent line 30 which provides a fluid communication path between the fuel tank 12 and the vent tank 13 (which may be a generally conventional vent tank). The inward vent line 30 is provided with an inward pressure check valve 32. Conveniently, the inward pressure valve 32 may be provided at or proximal to the vent tank 13. The inward pressure valve 32 has a predetermined cracking pressure which is selected to allow a degree of negative pressure to develop within the tank 12 but not to allow the pressure difference between the interior of the tank 12 and atmospheric pressure to exceed the design limitation of the tank 12.

The inward vent line 30 enters the tank via a vent distribution duct 34 which is arranged to distribute the inwardly venting air throughout the bays 20 of the fuel tank 12. The vent distribution duct 34 may be substantially as described in the Applicant's earlier International Patent Application WO2013/164311A1. Accordingly, the vent distribution duct 34 may be formed by a substantially closed cross section channel or pipe with a plurality of openings 36 or may be formed from an open channel. The vent distribution duct 34 may be at least partially formed by structural features of the aircraft wing or fuel tank 12 (for example stringers).

Separately to, and in parallel with, the vent line 30 there is provided an outward vent line 40. The outward vent line also provides a fluid communication path between the fuel tank 12 and the vent tank 13. The outward vent line 40 is provided with an outward pressure check valve 42. Conveniently, the outward pressure valve 42 may be provided at or proximal to the vent tank 13. The outward pressure valve 42 has a predetermined cracking pressure which is selected to allow a degree of positive pressure to develop within the tank 12 but not to allow the pressure difference between the interior of the tank 12 and atmospheric pressure to exceed the design limitation of the tank 12. The outward vent line 40 terminates in the fuel tank 12 with an outlet having a conventional float valve 50 which prevents or limits the entry of fuel overspill into the outward vent line 40 (and it will be appreciated that similar arrangements may be provided in the inward vent line if necessary).

In use, the partially closed fuel tank vent system of embodiments allows the pressure in the tank to increase to a positive pressure above ambient atmospheric pressure. This allows the tank to store an increased mass of inerting gas. As such during times of low demand (for example during cruise) additional NEA produced in the inerting system 13 can be stored in the fuel tank 12. Only if the positive pressure difference increases beyond the limit set by the outward vent valve 42 is the gas from the fuel tank 12 ullage outwardly vented via the vent tank 13.

The partially closed fuel tank vent system also allows the pressure in the tank 12 to increase to a negative pressure below ambient atmospheric pressure. This introduces a delay in the inward venting of the fuel tank (for example upon descent or as fuel is consumed). As the tank 12 will develop a negative pressure relative to ambient pressure and the pressure in the vent system when inward venting does occur a pressure differential will be provided between the inward venting line 30 and the fuel tank 12. This pressure differential will provide additional motive force to help draw the inwardly vented air along the vent distribution duct 34 and ensure that the inwardly vented air is well distributed along the fuel tank. The multiple outlets 36 of the vent distribution duct are positioned to distribute the inwardly vented air to multiple compartments 20 of the fuel tank 12. Thus, embodiments of the invention help to ensure that the incoming air is well distributed about the tank and minimise the risk of localised oxygen pockets which exceed the intended flammability limit.

A limitation of the embodiment of FIG. 3 is that the vent distribution duct 34 must have a sufficiently large diameter to ensure that the pressure drop (in addition to that of the inward pressure valve 32) is not too great. The pressure drop must be relatively low to assure that the structural limits of the wing/fuel tank are not exceeded in the event of the aircraft executing a descent at a greater rate than the system design limits. However, a large diameter vent distribution duct 34 may be difficult to install in the wing. The size is also a potential weight penalty. As the vent distribution duct 34 must typically pass through each rib 22 in order to reach all of the bays 20 within the tank 12 the size of the penetrations through the ribs also affects the strength of the structure.

Figure 4:
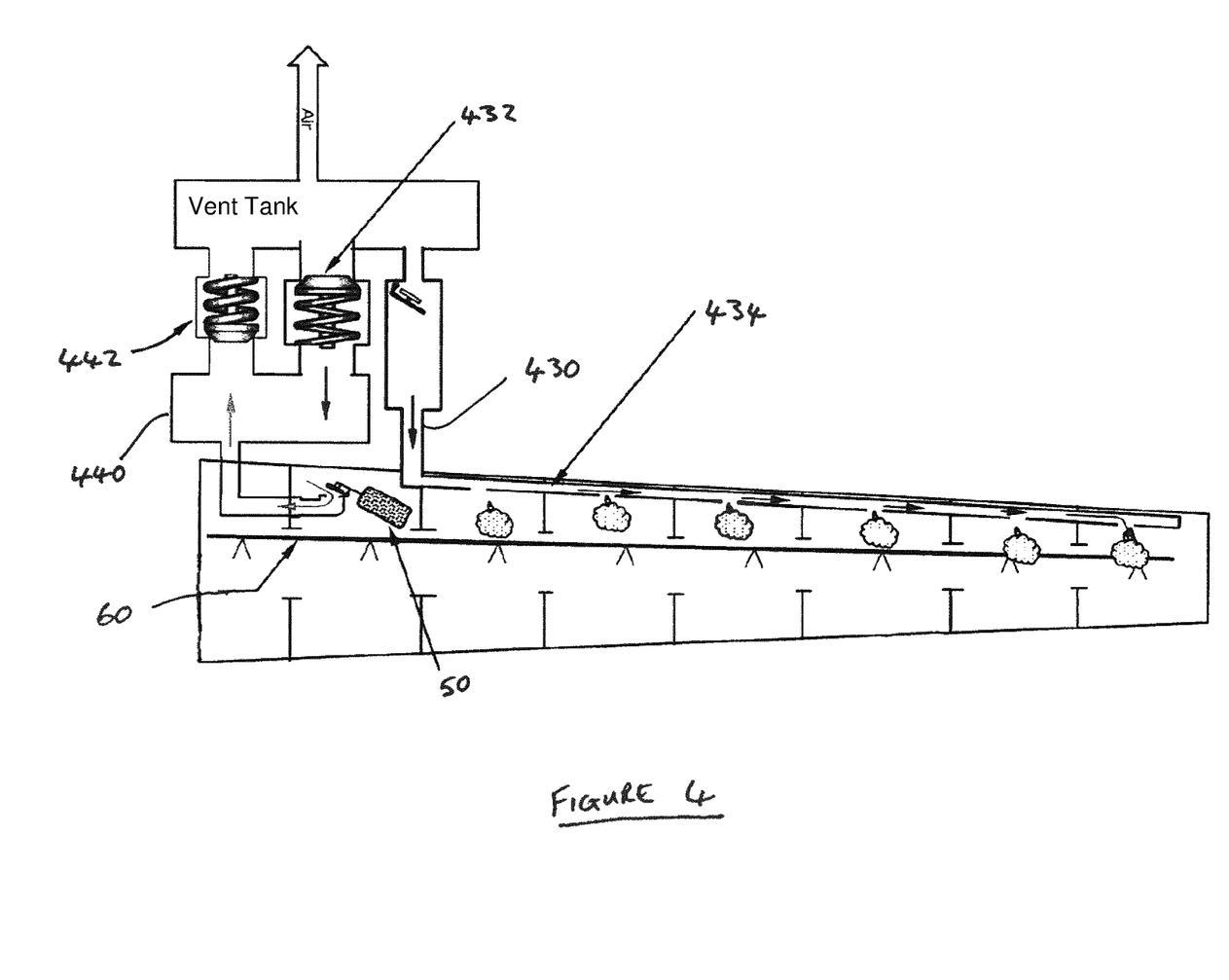
FIG. 4 is a schematic view of an aircraft fuel tank inerting and vent system in accordance with a second embodiment of the invention.

Accordingly, an alternative arrangement is illustrated in FIG. 4. In the embodiment of FIG. 4 the inward pressure valve 432 is independent of the inward vent line 430. The inward vent line 430 and the inward pressure valve 432 provide parallel paths between the fuel tank 412 and the vent tank 413. Conveniently, the inward pressure valve 432 may be provided in parallel with the outward pressure valve 442 (and could even be combined in single valve assembly) and utilises the outward vent line 440. Accordingly, in this embodiment the outward vent line 440 may be considered a pressure relief vent line.

In the embodiment of FIG. 4, the full available inward venting pressure difference can be used to drive the airflow through the inward venting line 430 and the inward distribution duct 434. For example, the pressure difference may be 2 psig rather than 0.1 psig. In the event of the descent rate of the aircraft exceeding the inerting system design limit the inward pressure valve 432 opens and utilises the line 440 to bypass the vent distribution line 430. This arrangement does not fully utilise the differential pressure capability of the wing to minimise air inflow except where the rate of descent of the aircraft is the maximum for which the system is designed.

Figure 5:
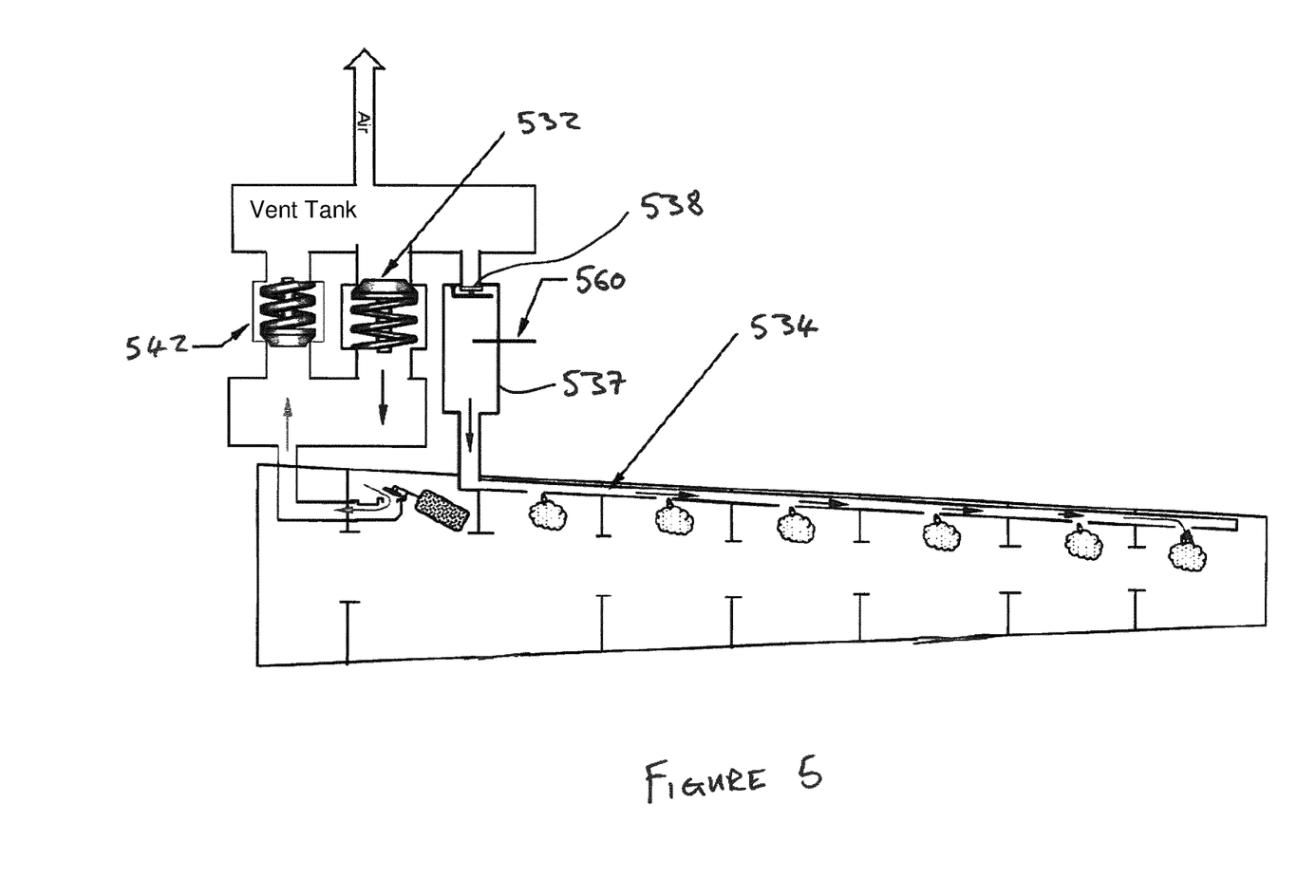
FIG. 5 is a schematic view of an aircraft fuel tank inerting and vent system in accordance with a third embodiment of the invention.

A further embodiment of the invention is illustrated in FIG. 5 in which the NEA is introduced into the tank 512 via an inlet 560 positioned in the inward vent line 530. The inward vent line may be provided with a mixing chamber 537 having a locally increased cross section at the point of introduction of the NEA to allow the NEA and inwardly vented air to premix. A one-way valve may be provided at between the vent tank 516 and the inward vent line 530 to prevent NEA from exiting the vent line without entering the fuel tank 513. This arrangement further reduces the risk of high concentration oxygen pockets since inwardly vented air and NEA are introduced together into the tank 513. It will be appreciated that this arrangement of NEA introduction may also be used in other embodiments of the invention (and that in some embodiments NEA could even be supplied both directly into the fuel tank and into the inward vent line).

Figures 6, 6B:
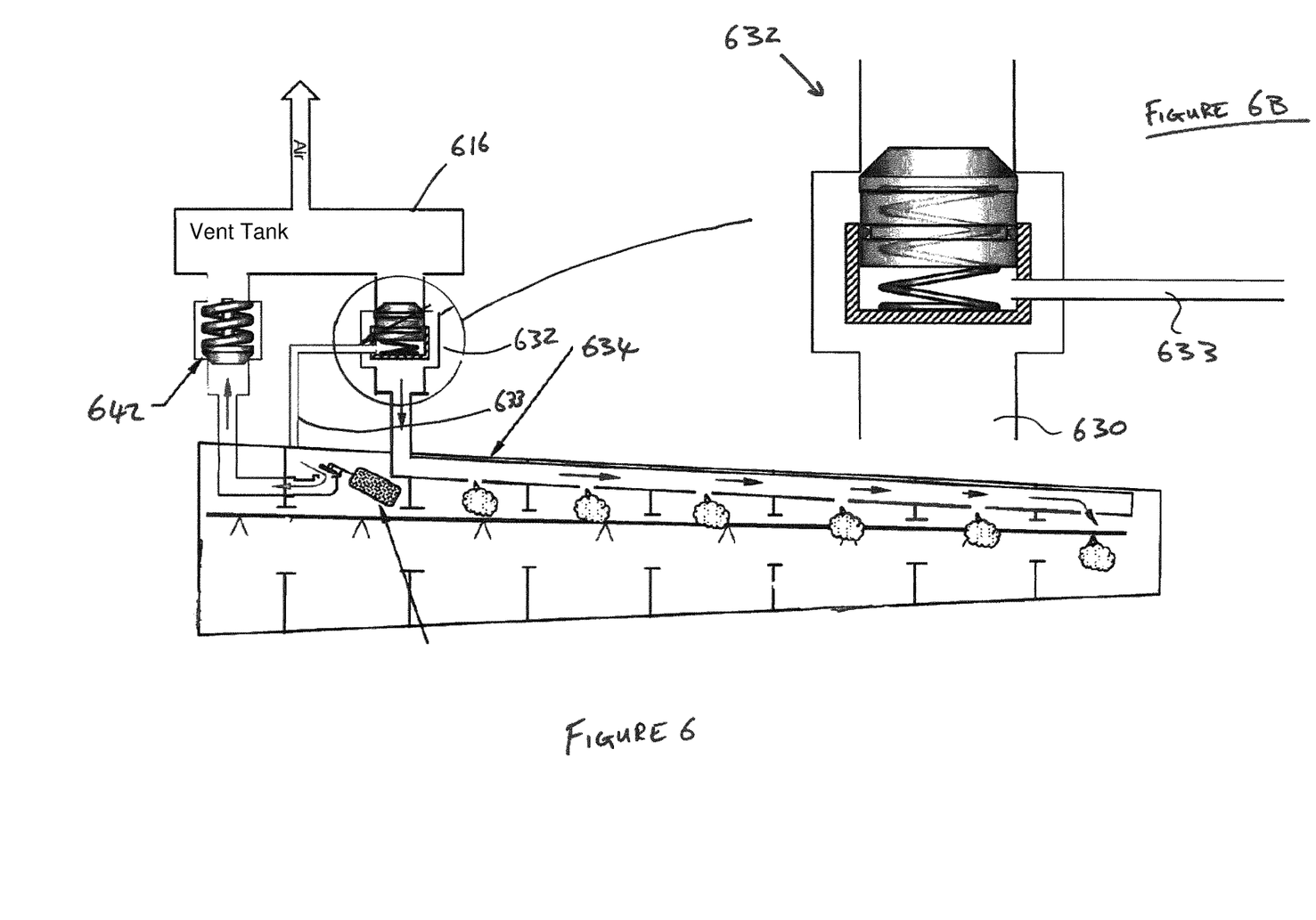
FIG. 6 is a schematic view of an aircraft fuel tank inerting and vent system in accordance with a fourth embodiment of the invention.

Another embodiment of the invention is shown in FIG. 6. The embodiment of FIG. 6 includes a modified inward pressure valve 632 (shown in detail in FIG. 6B). The modified inward pressure valve 632 is arranged so that the reverse of the pressure valve 632 is exposed to the pressure from the interior of the fuel tank 612 (rather than that of the vent line 630). The valve 632 could be in direct communication with the fuel tank 612 or if positioned remotely from the tank 612 (as shown in the figure) may be provided with a bleed line 633 which provides the fuel tank pressure to the seat of the valve 632. Advantageously, the embodiment of FIG. 6 enables the full tank differential pressure to be dropped across the inward vent distribution duct 634 rather than across the valve seat of the relief valve.

Although the invention is described above with reference to preferred embodiments, it will be appreciated that various changes or modifications may be made without departing from the scope of the invention, as defined in the appended claims. For example, whilst the embodiments have been described for simplicity with reference to a single fuel tank it will be appreciated that embodiments may equally be applied to arrangements having a plurality of fuel tanks (and typically at least two fuel tanks associated with a single vent tank and/or vent system). The skilled person will also appreciate that whilst the embodiments are described as having, for example, a single inward or outward vent lines and valves a plurality of substantially identical arrangements could be provided for the purpose of redundancy without altering the underlying operating principles.

The invention claimed is:

1. An aircraft fuel system comprising:
   at least one fuel tank;
   a source of inerting gas;
   an inlet for introducing the inerting gas into the at least one fuel tank; and
   a vent system comprising:
      a vent;
      an inward vent pressure valve disposed between the vent and the at least one fuel tank and configured to enable the at least one fuel tank to increase by a first predetermined pressure over ambient air pressure; and
      an outward vent pressure valve disposed between the at least one fuel tank and the vent and configured to enable the at least one fuel tank to decrease by a second predetermined pressure below ambient air pressure.

2. The aircraft fuel system as claimed in claim 1, wherein the vent comprises a vent tank; and the inward vent pressure valve and outward vent pressure valve are disposed between the at least one fuel tank and the vent tank.

3. The aircraft fuel system as claimed in claim 2, wherein the vent comprises a vent duct extending from the vent tank to an exterior of an aircraft.

4. The aircraft fuel system as claimed in claim 1, further comprising a vent distribution duct extending through the at least one fuel tank and arranged to receive inwardly vented air from the vent system and distribute the inwardly vented air across the at least one fuel tank.

5. The aircraft fuel system as claimed in claim 2, further comprising an outlet extending from the at least one fuel tank to the outward vent valve, the outlet comprising a float valve in the at least one fuel tank.

6. The aircraft fuel system as claimed in claim 1, further comprising an inward vent line for directing inwardly vented air from the vent to the at least one fuel tank and wherein the inward vent pressure valve bypasses the inward vent line.

7. The aircraft fuel system as claimed in claim 6, wherein the inward vent line extends from a vent tank to a vent distribution duct.

8. The aircraft fuel system as claimed in claim 6, wherein the inward vent pressure valve is provided in an outlet extending from the at least one fuel tank to the outward vent pressure valve.

9. The aircraft fuel system as claimed in claim 6, wherein the inlet for introducing the inerting gas deposits the inerting gas into the inward vent line.

10. The aircraft fuel system as claimed in claim 8, wherein the inward vent line includes a mixing chamber and the inlet for introducing inerting gas deposits the inerting gas at the mixing chamber.

11. The aircraft fuel system as claimed in claim 1, wherein the inward vent pressure valve is exposed to pressure from the at least one fuel tank.

12. The aircraft fuel system as claimed in claim 1, wherein the vent system further comprises a bleed duct in fluid communication with the at least one fuel tank to expose a valve seat of the inward vent pressure valve to pressure from the at least one fuel tank.

13. The aircraft fuel system as claimed in claim 1, wherein the source of inerting gas comprises an on board inert gas generating system.

14. An aircraft comprising the aircraft fuel system as claimed in claim 1.

* * * * *